「United States Patent」

(12) United States Patent
Hagen

(10) Patent No.: US 9,382,878 B2
(45) Date of Patent: Jul. 5, 2016

(54) METHOD FOR OPERATING A FUEL SYSTEM AND FUEL SYSTEM

(75) Inventor: Harald Hagen, Creussen (DE)

(73) Assignee: AUDI AG, Ingolstadt (DE)

( * ) Notice: Subject to any disclaimer, the term of this patent is extended or adjusted under 35 U.S.C. 154(b) by 279 days.

(21) Appl. No.: 14/129,710

(22) PCT Filed: Jul. 2, 2012

(86) PCT No.: PCT/EP2012/002771
§ 371 (c)(1),
(2), (4) Date: Mar. 20, 2014

(87) PCT Pub. No.: WO2013/000582
PCT Pub. Date: Jan. 3, 2013

(65) Prior Publication Data
US 2014/0216420 A1 Aug. 7, 2014

(30) Foreign Application Priority Data
Jun. 30, 2011 (DE) .......... 10 2011 106 006

(51) Int. Cl.
*F02M 33/00* (2006.01)
*F02M 25/08* (2006.01)
*B60K 15/03* (2006.01)
(Continued)

(52) U.S. Cl.
CPC .......... *F02M 25/08* (2013.01); *B60K 15/03177* (2013.01); *B60K 15/03519* (2013.01); *F02M 25/0836* (2013.01); *F02M 37/0082* (2013.01); *B60K 2015/0319* (2013.01); *B60K 2015/03171* (2013.01); *B60K 2015/03217* (2013.01); *B60K 2015/03256* (2013.01); *B60K 2015/03557* (2013.01)

(58) Field of Classification Search
CPC .............. F02M 25/08; F02M 25/0836; B60K 15/03519; B60K 2015/03217; B60K 2015/0319; B60K 2015/03557; B60K 2015/03171
USPC .............. 123/518; 73/114.38, 114.39, 114.43
See application file for complete search history.

(56) References Cited

U.S. PATENT DOCUMENTS 4,178,894 A 12/1979 Nau
5,964,204 A 10/1999 Freeland
(Continued)

FOREIGN PATENT DOCUMENTS

DE  43 10 452 A1  10/1994
DE  101 09 058 A1  9/2002
(Continued)

OTHER PUBLICATIONS

Chinese Search Report issued in counterpart Chinese Patent Application No. 201280032318.7.
(Continued)

*Primary Examiner* — Hai Huynh
(74) *Attorney, Agent, or Firm* — Henry M. Feiereisen LLC

(57) ABSTRACT

In a method for operating a fuel system of an internal combustion engine, the fuel system has a fuel tank and a ventilation device having at least one ventilation valve for ventilating the fuel tank in the direction of a device that generates a negative pressure, at least intermittently. A magnitude of deformation caused by an internal pressure of the fuel tank of the fuel tank is measured and, if the magnitude of deformation exceeds a threshold, the ventilation valve is closed and/or a bypass is opened.

14 Claims, 11 Drawing Sheets

(51) Int. Cl.
*B60K 15/035* (2006.01)
*F02M 37/00* (2006.01)

(56) References Cited

U.S. PATENT DOCUMENTS

| | | | |
|---|---|---|---|
| 7,665,447 B2 * | 2/2010 | Shinagawa | B60K 15/03504 123/516 |
| 8,607,765 B2 | 12/2013 | Hagen | |
| 9,133,783 B2 * | 9/2015 | Slaymaker | F02D 41/065 |
| 2003/0226596 A1 | 12/2003 | Bolle et al. | |
| 2009/0025694 A1 | 1/2009 | Shinagawa et al. | |
| 2010/0147847 A1 | 6/2010 | Gebert | |
| 2011/0284125 A1 | 11/2011 | Hagen et al. | |
| 2012/0111307 A1 | 5/2012 | Hagen | |
| 2012/0152489 A1 | 6/2012 | Hagen | |
| 2012/0160218 A1 | 6/2012 | Hagen | |
| 2012/0160219 A1 | 6/2012 | Hagen | |
| 2012/0160220 A1 * | 6/2012 | Hagen | B60K 15/03519 123/520 |
| 2012/0168454 A1 | 7/2012 | Hagen | |
| 2012/0174894 A1 | 7/2012 | Hagen | |
| 2012/0175379 A1 | 7/2012 | Hagen | |
| 2012/0179354 A1 * | 7/2012 | Hagen | B60K 15/03519 701/102 |
| 2012/0180760 A1 | 7/2012 | Hagen | |
| 2012/0180767 A1 | 7/2012 | Hagen | |
| 2012/0186670 A1 | 7/2012 | Hagen | |
| 2012/0234074 A1 | 9/2012 | Hagen | |
| 2014/0137964 A1 * | 5/2014 | Aso | F02M 25/0836 137/587 |

FOREIGN PATENT DOCUMENTS

| | | |
|---|---|---|
| DE | 102 25 327 | 1/2004 |
| DE | 102007026817 | 10/2008 |
| DE | 102008062243 | 6/2010 |
| DE | 102009009901 | 8/2010 |
| DE | 102009057227 | 6/2011 |
| GB | 2 264 107 | 8/1993 |
| JP | 04-151332 | 5/1992 |

OTHER PUBLICATIONS

English translation of Chinese Search Report issued in counterpart Chinese Patent Application No. 201280032318.7 on May 26, 2015.
International Search Report issued by the European Patent Office in International Application PCT/EP/2012/002771.
International Search Report issued by the European Patent Office in International Application PCT/EP2012/002771 on Sep. 27, 2012.

* cited by examiner

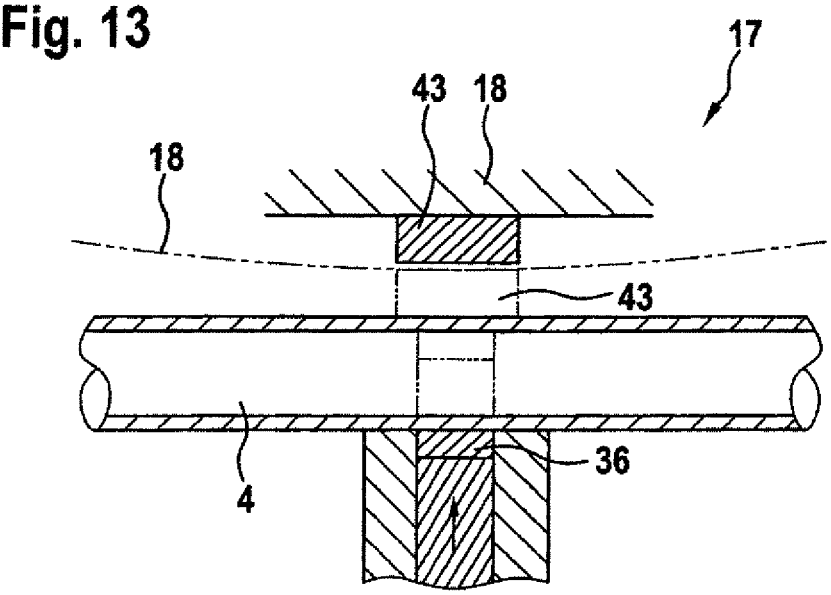
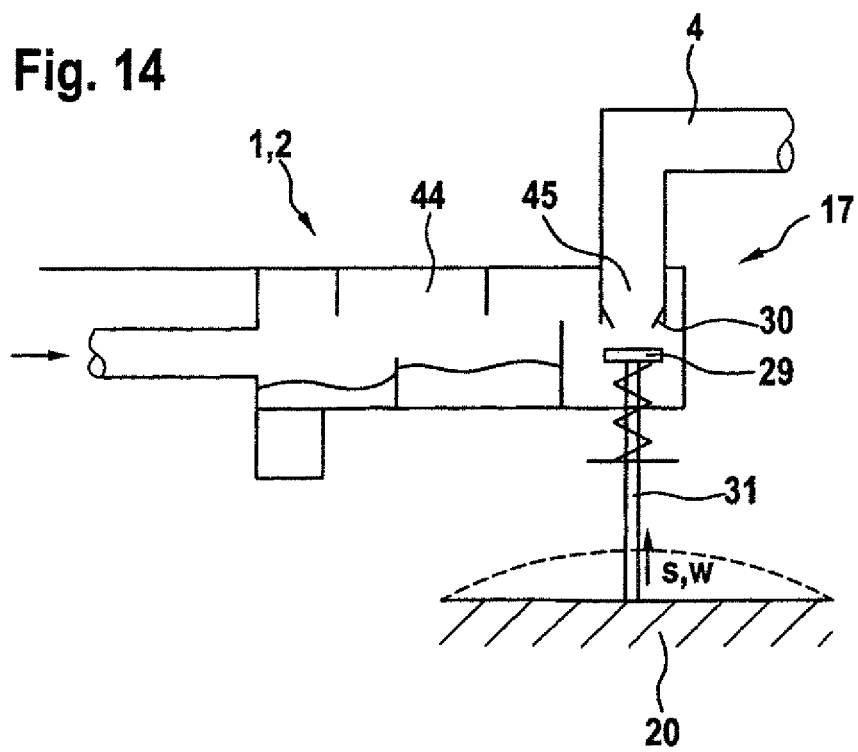

METHOD FOR OPERATING A FUEL SYSTEM AND FUEL SYSTEM

CROSS-REFERENCES TO RELATED APPLICATIONS

This application is the U.S. National Stage of International Application No. PCT/EP2012/002771, filed Jul. 2, 2012, which designated the United States and has been published as International Publication No. WO 2013/000582 and which claims the priority of German Patent Application, Serial No. 10 2011 106 006.9, filed Jun. 30, 2011, pursuant to 35 U.S.C. 119(a)-(d).

BACKGROUND OF THE INVENTION

The invention relates to a method for operating a fuel system of a combustion engine, wherein the fuel system has a fuel tank and a ventilation device which has at least one ventilation valve for ventilating the fuel tank in the direction of a device which at least temporarily generates negative pressure. The invention also relates to a fuel system.

Methods of the aforementioned type are known from the state-of-the-art. The corresponding fuel system is for example assigned to a motor vehicle or a drive system of the motor vehicle. The drive system has in particular at least one combustion engine and is for example configured as hybrid drive system, i.e., it includes the combustion engine as well as at least one electric machine, wherein the combustion engine and the electric machine generate a drive torque of the drive system at least temporarily in cooperation. The fuel system supplies fuel from the fuel tank to the combustion engine. Oftentimes a volatile hydrocarbon fuel is used as fuel, for example gasoline. The fuel tank therefore normally contains a volume of liquid fuel as well as a volume of gaseous fuel, which in particular accrues above the liquid fuel. The fuel tank can be a closed tank, in particular a pressure tank or a partially closed in particular also pressure-less tank. The closed tank is particularly used for reducing emissions.

Fluctuations of the temperature of the fuel, for example caused by changes of the ambient temperature, can cause pressure fluctuations in the fuel tank. For this reason a ventilation device is assigned to the fuel tank. It serves for ventilating the fuel tank, which allows reducing excessive pressure in the fuel tank. For this purpose the ventilation device ventilates the fuel tank for example through a ventilation line. During ventilation, gaseous and liquid fuel can exit the fuel tank through the ventilation device or the ventilation line. The ventilated fuel thus is first present as a mixture of gaseous and liquid fuel. This is in particular the case when the fuel tank is ventilated at high pressure inside the fuel tank. The high pressure or the high pressure differential between the pressure inside the fuel tank and the pressure outside the fuel tank causes high flow velocities of the ventilated fuel which causes liquid fuel to be carried along by the gaseous fuel.

The gaseous fuel can be supplied to the combustion engine or its intake system, wherein a fuel accumulator, which is preferably configured as activated carbon accumulator, can be arranged between the fuel tank and the combustion engine. The fuel accumulator serves for temporarily storing gaseous fuel, i.e., to take up gaseous fuel when unneeded gaseous fuel is present and to give off gaseous fuel as soon as the gaseous fuel can be supplied into the combustion engine. However, no liquid fuel must enter the fuel accumulator or the combustion engine in order to prevent damage or malfunction.

For this reason, the ventilation device can have at least one separation device, which serves for separating gaseous and liquid fuel. The separation device is thus intended to prevent transfer of liquid fuel from the fuel tank through the ventilation device into the combustion engine or the fuel accumulator. The separation device separates liquid fuel and allows gaseous fuel to pass. The separated liquid fuel enters a temporary accumulator of the separation device. The term temporary accumulator does not mean that an actual (temporary) storing of the liquid fuel is intended. Rather, the liquid fuel can be directly discharged from the temporary accumulator or the separation device, preferably in the direction of the fuel tank. During the course of this, however, the fill level of the temporary accumulator may increase, for example due the discharge volume flow being limited, in particular by a line cross-section or the like. The separated liquid fuel can thus at least temporarily not be discharged as fast as it is introduced into the temporary accumulator. However, a temporary storing of the liquid fuel for example over a defined period of time can be realized.

During operation of the fuel system it should be prevented that the amount of liquid fuel in the temporary accumulator or the separation device exceeds a threshold amount, i.e., that the fill level of the temporary accumulator becomes greater than a threshold fill level, since this can adversely affect the efficiency of the separation device. The greater the amount of liquid fuel in the temporary accumulator the greater the risk that liquid fuel also exits the separation device together with the gaseous fuel and is carried along in the direction of the fuel accumulator or the combustion engine. For this reason, the fuel delivery device can be assigned to the separation device. The fuel delivery device is used to transport liquid fuel from the temporary accumulator, in particular in the direction of the fuel tank. The fuel delivery device is usually configured as suction jet pump, wherein fuel is often used as operating medium of the suction jet pump and is delivered by a fuel pump of the fuel system out of the fuel tank in the direction of the combustion engine.

In known methods for operating the fuel system of the combustion engine, the fuel tank is ventilated by means of the ventilation device, usually based on the internal pressure of the fuel tank and a temperature. This means that for ventilating the fuel tank the ventilation valve of the ventilation device is adjusted based on the internal pressure in the fuel tank and the temperature. However, this is only possible when the combustion engine is activated because only in this case a control device is activated, which is assigned to the combustion engine or the fuel system. This control device serves for adjusting the ventilation valve based on the, in particular measured, internal pressure of the fuel tank and the, in particular measured, temperature for ventilating the fuel tank. In phases of standstill, i.e., when the combustion engine is deactivated and with this the control device is deactivated, the internal pressure of the fuel tank is usually limited by at least one mechanical overflow valve, which is set to a typical pressure level. When the temperature in the fuel tank changes, for example due to heat introduction by the combustion engine, which is still hot from operation, or due to external influences, a pressure is established in the fuel tank which corresponds to the vapor pressure of the fuel. When this internal pressure of the fuel tank reaches or exceeds the typical pressure level and in particular a defined maximal internal pressure of the fuel tank, the overflow valve opens for ventilating the fuel tank. A deactivated combustion engine is to be understood as a combustion engine that stands still, while an activated combustion engine is at least operated in neutral and in particular provides a torque.

When the combustion engine is deactivated, the fuel tank is thus usually ventilated exclusively due to the internal pressure of the fuel tank. However, it is often the case that the admissible maximum internal pressure of the fuel tank changes with the temperature, i.e., it is dependent on the temperature. In particular when the combustion engine is deactivated and the internal pressure of the fuel tank can only be lowered via the overflow valve, the fuel tank may thus be impinged with an internal pressure, which results in forces that exceed the strength of the fuel tank. This results for example in unacceptable flow behaviors or in undesired, irreversible deformations of the fuel tank, in particular of a fuel tank shell.

The fuel accumulator, which is provided for the fuel system, has to be regenerated from time to time. This occurs for example by scavenging the fuel accumulator or increasing the cross-section. During scavenging, scavenging air is pumped through the fuel accumulator, preferably in the direction of the combustion engine or its intake system. However, scavenging of the fuel accumulator or increasing the cross-section causes a negative pressure. The fuel accumulator is thus at least temporarily a device that generates negative pressure. In particular, the fuel accumulator is a regenerable filter device. Because the fuel accumulator is connected with the fuel tank via the ventilation device, a negative pressure may also develop in the fuel tank, i.e., the pressure inside the fuel tank is smaller than the outside pressure. Herein, the deformation of the fuel tank can occur analogous to the aforementioned case of overpressure.

SUMMARY OF THE INVENTION

It is thus an object of the invention to propose a method for operating a fuel system of a combustion engine, which does not have the mentioned disadvantages but enables a reliable operation of the fuel system, in particular also when the combustion engine is deactivated.

According to the invention this is achieved in that the degree of deformation of a deformation region of the fuel tank caused by an internal pressure of the fuel tank is detected and in case the degree of deformation exceeds a threshold value the ventilation valve is closed or a bypass is opened. The fuel tank thus includes the deformation region, which in particular is part of the fuel tank shell. The deformation region is configured to become deformed in dependence on the pressure inside the fuel tank. When the internal pressure of the fuel tank increases or decreases, this pressure causes for example the deformation of the deformation region towards the outside or the inside. The higher or the smaller the internal pressure of the fuel tank or respectively, the greater the difference between the internal pressure of the fuel tank and an outside pressure outside the fuel tank, the stronger the deformation region becomes deformed toward the outside or the inside. It is provided to detect the degree of deformation in the form of the deformation value. Thus, the deformation value is for example zero when the internal pressure of the fuel tank essentially corresponds to the outside pressure and thus no deformation of the deformation region occurs. On the other hand, when the internal pressure of the fuel tank falls below the outside pressure, the deformation region is urged inwardly, which results in a deformation and consequently a deformation greater then zero. Vice versa an increase of the internal pressure of the fuel tank can of course lead to outward deformation of the deformation region, because the internal pressure of the fuel tank is greater than the outside pressure. In the present case a negative pressure is generated in the fuel tank by the at least temporarily negative pressure-generating device, which is connected with the fuel tank via the ventilation device. The deformation region will thus be deformed inwardly.

In order to prevent an inadmissibly low internal pressure of the fuel tank or inadmissibly high degree of deformation, the ventilation valve is closed when the deformation value exceeds the threshold value. The ventilation valve is situated in the ventilation device between the at least temporarily negative pressure-generating device and the fuel tank. In this case, the ventilation valve or the ventilation device prevents the in particular gaseous fuel from exiting the fuel tank. This approach allows reliably avoiding the occurrence of inadmissibly low internal pressure of the fuel tank in particular also when the combustion engine is deactivated. The closing of the ventilation valve in dependence on the deformation value has the advantage that the ventilation valve is not only actuated in response to the internal pressure of the fuel tank, but the temperature of the fuel tank or its influence on the expansion limit of the material of which the fuel tank is made is also taken into account. Thus, due to temperature-dependent material properties, a stronger deformation of the deformation region will occur at higher temperature but at same pressure than at lower temperature. At a higher temperature the deformation value will thus faster reach values above which the fuel tank is not merely elastically, i.e., reversibly deformed, but rather plastically, i.e., irreversibly deformed. However, a plastic deformation of the fuel tank or of regions of the fuel tank means damage, which at least in severe cases requires replacement of the fuel tank.

With the method according to the invention the occurrence of such a strong deformation can be reliably avoided.

In addition or as an alternative, the bypass can be opened when the deformation value exceeds the threshold value. The bypass is situated between the fuel tank and for example a vicinity of the fuel tank. Thus air, in particular fresh air can enter through the bypass into the fuel tank independent on the setting of the ventilation valve. In this way it can be avoided that the deformation value exceeds the threshold value or that the fuel tank is deformed to an inadmissible degree.

A refinement of the invention provides that the deformation of the deformation region is mechanically transmitted to the ventilation valve and/or a bypass valve of the bypass so that the deformation causes a force that opens the ventilation valve and/or the bypass valve. For example, a force transmission element is arranged between the deformation region and the ventilation valve or the bypass valve so that the deflection of the deformation region, which occurs in case of a deformation, is transmitted via the force transmission element to the ventilation valve or the bypass valve. The force transmission element can for example be a rod, in particular a coupling rod or the like. The force transmission element is preferably supported in a guide, wherein the force transmission element can be supported for longitudinal or rotatable movement.

A refinement of the invention provides that the detection of the deformation value is realized by means of a sensor and the opening of the ventilation valve and/or the bypass valve is effected by a control device which is connected with the sensor. Instead of the mechanical transmission of the deformation described above an electric transmission can thus be provided. For this purpose the sensor, by means of which the deformation value can be detected, is provided on the deformation region. The deformation value is analyzed by means of the control device. Preferably the control device is different from the control device of the combustion engine so that the here provided control device is not deactivated but rather continues to operate when the combustion engine is deactivated. When the control device determines that the deformation value is above the threshold value it causes the opening of the ventilation valve and/or the bypass valve. For this purpose the ventilation valve or the bypass valve is for example directly connected with the control device or is electrically connected to the same.

A refinement of the invention provides that the threshold value is selected so that the deformation of the deformation region occurs elastically when the deformation value equals the threshold value. As explained above it is desirable when the deformation region or of the entire fuel tank is deformed purely elastically and not already plastically. A plastic deformation of the deformation region or the fuel tank corresponds to damage to the fuel tank and usually requires its replacement. The elastic deformation on the other hand is fully reversible so that no damage to the fuel tank occurs until the deformation value reaches the threshold value. For this reason the threshold value is selected so that even at maximum deformation, i.e., when the deformation value reaches the threshold value, a purely elastic deformation of the deformation region is established. In addition the threshold value preferably has a defined distance to the deformation value at which a plastic deformation of the deformation region or the fuel tank would occur.

A refinement of the invention provides that the threshold value is determined in dependence on an environmental condition, in particular temperature. The ambient temperature can influence the effect of the internal pressure of the fuel tank on the deformation or on the deformation value. Insofar it is advantageous when the threshold value is determined by taking the environmental conditions into account at which the internal pressure of the fuel tank has a maximal effect on the deformation, i.e., at which the deformation value reaches the highest value at a defined pressure. When the deformation value is detected by means of the sensor, the environmental condition can also be determined by measuring, in particular by means of a temperature sensor.

The invention also relates to a fuel system of a combustion engine, in particular for performing the method according to the above description, wherein the fuel system has a fuel tank, a ventilation device which has at least one ventilation valve for ventilating the fuel tank in the direction of a device which at least temporarily generates negative pressure. The fuel system is configured to detect the deformation value of a deformation of the deformation region caused by an internal pressure of the fuel tank and when the deformation value exceeds a threshold value to close the ventilation valve and/or open a bypass. In other words the fuel system has corresponding means to proceed as described. The fuel system can be further refined according to the above disclosure.

A refinement of the invention provides for at least one stiffening element arranged adjacent to the deformation region. The fuel tank can have the one or multiple stiffening elements, which in principle can be arranged in the fuel tank in any desired manner. The stiffening element or respectively, the stiffening elements are intended to stiffen the fuel tank or the fuel tank shell and with this counteract the deformation. For proper functioning of the ventilation device or the ventilation valve it is therefore necessary that no stiffening element is present in the deformation region itself. However, the at least one stiffening element is preferably present adjacent the deformation region so that the deformation region can be deformed due to the internal pressure of the fuel tank, not however regions of the fuel tank adjacent to the deformation region.

A refinement of the invention provides that the ventilation device has a ventilation line which on one of its sides is fluidly connected with the fuel tank and on its other opposing side with the negative pressure-generating device, and/or that the bypass has a bypass line, which on one of its sides is fluidly connected with the fuel tank and on its other opposing side with an environment of the fuel tank. The ventilation of the fuel tank is provided via the ventilation line of the ventilation device. For this purpose the ventilation line leads with its one side into the fuel tank and with its other side to the negative pressure-generating device, in particular the fuel accumulator. The negative pressure-generating device is thus arranged in flow direction between the fuel tank and the combustion engine. When negative pressure is generated by the device, air or fuel is sucked in via the ventilation line from the fuel tank. Thus, the negative pressure is also present in the fuel tank, which depending on the circumstances may cause the deformation. In addition or as an alternative, the bypass has the bypass line. Like the ventilation line, the bypass line is fluidly connected with the fuel tank on its one side. On the other side it leads into the environment of the fuel tank, wherein here preferably a filter is provided, which is located in flow direction between the environment and the bypass line.

A refinement of the invention provides that the ventilation line has the ventilation valve and/or the bypass line has a bypass valve. The ventilation line as well as the ventilation valve serve for ventilating the fuel tank. For this purpose the ventilation line can for example be connected to the fuel tank via the ventilation valve or the ventilation valve can be connected to the ventilation line on the side of the ventilation line that faces away from the fuel tank. However, preferably the ventilation valve is present in the ventilation line, i.e., integrated in the ventilation line. The same applies to the bypass line and the bypass valve.

A refinement of the invention provides that the fuel tank, in particular the deformation region, is at least partially made of plastic. Compared to other materials, plastic has the advantage that it is very light and thus a weight reduction of the fuel tank can be achieved compared to a fuel tank, which is for example made of metal. In the case of a fuel tank made of plastic, however, the problem arises that the conventionally used plastic withstands temperature only to a limited degree. At increased internal pressure of the fuel tank and high temperature, for example higher or equal to 50° C., plastic deformations, i.e., irreversible deformations can occur if no reliable ventilation of the fuel tank, including the case when the combustion engine is not activated, is provided. The same applies in the case of decreased internal pressure of the fuel tank and high temperature, when the ventilation of the fuel tank is not interrupted or air is not conducted to the fuel tank via the bypass. Preferably the deformation region is made of the same material as other regions of the fuel tank, in particular the fuel tank shell. However, different materials may also be used for the deformation region than for the other regions of the fuel tank. For example, the deformation region can be made of a plastic and the further regions of the fuel tank can be made of another plastic or a metal.

BRIEF DESCRIPTION OF THE DRAWING

In the following, the invention is explained in more detail by way of the exemplary embodiments shown in the drawing without limiting the invention. It is shown in.

DETAILED DESCRIPTION OF PREFERRED EMBODIMENTS

Figure 1:
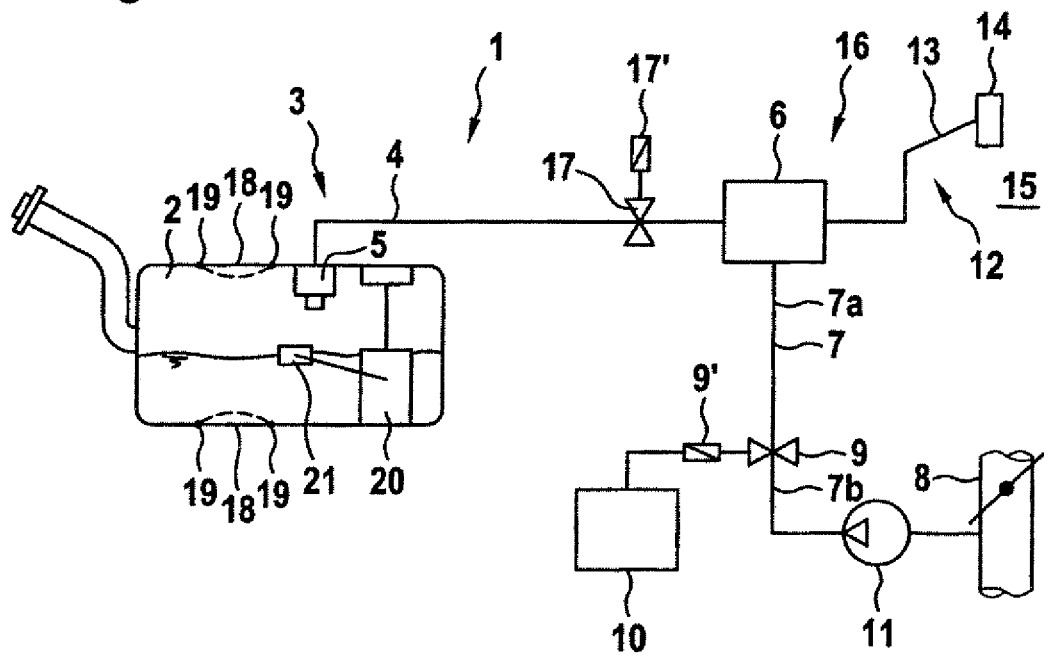
FIG. 1 a schematic representation of a first embodiment of a fuel system of a combustion engine, with a ventilation device, which has at least one ventilation valve for ventilating the fuel tank, FIG. 2 a schematic representation of the fuel system in a second embodiment, FIG. 3 a schematic representation of the fuel system in a third embodiment, FIG. 4 a cross-section through the fuel tank, wherein the fuel tank has a deformation region, FIG. 5 a detailed section from the fuel tank described in FIG. 4, FIG. 6 a first embodiment of the ventilation valve, FIG. 7 a second embodiment of the ventilation valve, FIG. 8 A third embodiment of the ventilation valve, FIG. 9 a fourth embodiment of the ventilation valve in a position, FIG. 10 embodiment of the ventilation valve of FIG. 9 in a different position, FIG. 11 a fifth embodiment of the ventilation valve in a position, FIG. 12 the ventilation valve from FIG. 11 in a different position, FIG. 13 a sixth embodiment of the ventilation valve, FIG. 14 a first possible arrangement of the ventilation valve, FIG. 15 a second possible arrangement of the regulation valve, FIG. 16 a third possible arrangement of the ventilation valve, wherein the ventilation valve is in a first position, FIG. 17 the arrangement of the ventilation valve from FIG. 16, wherein the ventilation valve is in a different position, FIG. 18 a fourth possible arrangement of the ventilation valve, FIG. 19 a fifth possible arrangement of the ventilation valve, FIG. 20 a sixth possible arrangement of the ventilation valve, wherein the ventilation valve is in a position, FIG. 21 the arrangement of the ventilation valve from FIG. 20, wherein the ventilation valve is in a different position, and FIG. 22 a levered transmission for the ventilation valve.

FIG. 1 shows a schematic representation of a fuel system 1. The fuel system 1 is for example part of a motor vehicle or a drive system of the motor vehicle. The fuel system 1 has a fuel tank 2 and a ventilation device 3 for ventilating the fuel tank 2. The ventilation device 3 can have a separation device. The separation device serves for separating liquid fuel out of a mixture of liquid and gaseous fuel. The separated liquid fuel is subsequently present in a temporary accumulator of the separation device 4 and can be supplied again to the fuel tank 2 for example by a return line. Preferably, the return line has a valve, in particular a drainage valve, preferably a check valve. Instead of the return line only the valve can also be provided, in particular when at least portions of the separation device are located in the fuel tank 2, so that fuel exiting from the temporary accumulator directly enters the fuel tank 2 through the valve. The valve is configured so that fuel can only exit but not enter the temporary accumulator through the return line. This prevents that fuel enters the temporary accumulator through the return line from the fuel tank 2.

The ventilation device 3 is in flow communication with the fuel tank 2 via a ventilation line 4. On the side of the ventilation line 4, which faces the fuel tank, or in the fuel tank 2 a ventilation valve 5 is provided, which switches in dependence on the fill level of the fuel tank. The ventilation valve 5 is, however, optional, the fuel system 1 may thus also not include the ventilation valve. Usually the ventilation valve 5 is configured so that it is only open at a fill level of the fuel tank below a defined fill level of the fuel tank, in particular the maximal fill level of the fuel tank, i.e., fuel, in particular gaseous fuel, can enter the ventilation line 4 from the fuel tank 2. On the side facing away from the fuel tank 2, the ventilation line 4 enters into a fuel accumulator 6, in particular an activated carbon filter. The fuel accumulator 6 serves for temporary storage of gaseous fuel. From the fuel accumulator 6, the gaseous fuel can be returned to the combustion engine or an intake zone 8 of the combustion engine via a supply line 7. The supply line 7 has a first ventilation valve 9, which can be actuated by means of an actuation device 9'. The ventilation valve 9 and the actuation device 9' are preferably configured so that the flow cross-section of the ventilation valve 9 can be continuously adjusted.

Two overflow valves (here not shown) can be connected in parallel to the ventilation valve 9. The overflow valves each have a closure element, which is impinged by a spring force of a spring. They are configured so as to enable opposite flow directions. The overflow valves open or respectively close in dependence on a pressure differential between a first section 7a of the supply line 7 which first section 7a is located on a side of the ventilation valve 9, and a second section 7b which is located on the opposite side of the ventilation valve 9. One of the overflow valves opens as soon as a pressure is established in the section 7a which exerts a force on the closure element of the overflow valve which is greater than the sum of a force caused by a pressure established in the section 7b and the spring force of the spring of the overflow valve. The other one of the overflow valves on the other hand opens when the force caused by the pressure in the section 7b is greater than the sum of the force caused by the pressure in the section 7a and the spring force of the spring of the overflow valve. By means of the overflow valves, the ventilation valve can thus be bypassed when an excessive pressure exists on the side of the ventilation valve 9.

The ventilation valve 9 or its actuation device 9' is connected to a control device 10. The control device 10 is in particular a part of or corresponds to a motor control unit of the combustion engine. The ventilation valve 9 is configured in the form of an FTIV (Fuel Tank Isolation Valve) or is integrated in the same. The FTIV can be electronically adjusted by the control device 10 for ventilating the fuel tank 2.

The fuel accumulator 6 has to be regenerated from time to time. This occurs for example by scavenging the fuel accumulator 6 or by an increase of the cross-section. For the scavenging, a scavenging air pump 11 is provided which delivers air via a scavenging-air supply 12 through the fuel accumulator 6 in the direction of the combustion engine or its intake zone 8. The scavenging-air supply 12 has a scavenging-air line 13 and for example a filter 14, wherein the scavenging-air line 13 is located in terms of flow between the fuel accumulator 6 and the filter 14. By means of the scavenging-air pump 11, air can thus enter from the environment 15 of the fuel system 1 via the filter 14 and the scavenging-air line 13 into the fuel accumulator 6 and from there via the supply line 7 into the combustion engine or its intake zone 8. However, because the fuel accumulator 6, in addition to being connected to the supply line 7 and the scavenging-air line 13, is also connected to the ventilation line 4, the case can occur that when regenerating the fuel accumulator 6 air is not only suctioned in via the scavenging-air line 13, but also out of the fuel tank 2 via the ventilation line 4. This leads to a decrease of the internal pressure of the fuel tank 2. The fuel accumulator or respectively the scavenging-air pump 11 form a device 16, which at least temporarily generates negative pressure. The negative pressure generated in the fuel tank 2 when regenerating the fuel accumulator 6 can lead to deformation of the fuel tank. When an excessive negative pressure is established in the fuel tank 2, i.e., when the internal pressure of the fuel tank is too low, the fuel tank 2 may undergo plastic deformation. However, this is tantamount to damage to the fuel tank 2 and thus has to be avoided.

Beside the ventilation valve 9, the fuel system 1 according to the invention therefore also has a second ventilation valve 17 with a corresponding actuation device 17'. The second ventilation valve 17 is located in the ventilation line 4 and in terms of flow is therefore arranged between the fuel tank 2 and the fuel accumulator 6.

The fuel tank 2 has at least one deformation region 18 (here two deformation regions 18), which can be deformed due to the internal pressure in the fuel tank. It is provided that the fuel system 1 is configured to detect the degree of deformation of the deformation region 18, and when the deformation value exceeds a threshold value, to close the second ventilation valve 17. Preferably, the fuel tank 2 also has stiffening elements 19 which are arranged adjacent to or inside the fuel tank 2. The stiffening elements 19 serve for increasing the stiffness of the fuel tank 2 in regions that are located outside of the deformation regions 18. In this way, only deformation of the deformation regions is permitted to occur in response to the internal pressure of the fuel tank 2 but not of further regions of the fuel tank 2. The deformation regions 18 are advantageously made of the same material as the further regions of the fuel tank 2 and also have the same wall thickness. In an alternative embodiment, the deformation regions can of course also be made of a different, in particular softer material, in particular plastic and/or have a smaller wall thickness so that the deformation of the deformation regions 18 occurs before other regions of the fuel tank become deformed.

In the here shown embodiment, the deformation of at least one of the deformation regions 18 is electronically detected and the ventilation valve 17 correspondingly controlled. In an alternative embodiment, it can also be provided that the deformation of at least one of the deformation regions 18 is mechanically transmitted to the ventilation valve 17. Thus the deformation causes a force that opens the ventilation valve 17. When the detected deformation value exceeds the threshold value, the ventilation valve is closed. In FIG. 1 a possible deformation of the deformation regions 18 is indicated by dashed lines.

The fuel system 1 also includes a fuel pump 20 with a float 21. By means of the float 21 the fill level of the fuel tank can be determined and the fuel pump correspondingly controlled.

Figure 2:
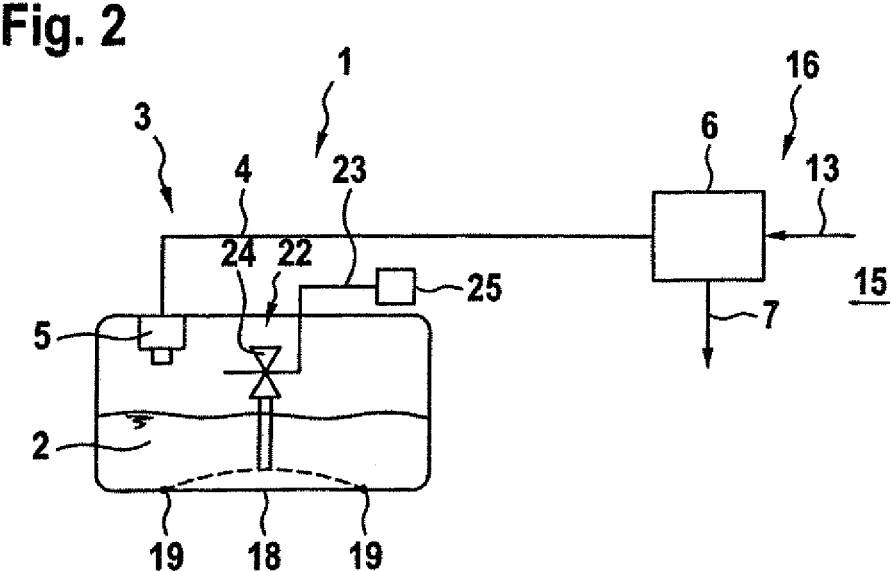

FIG. 2 shows a second embodiment of the fuel system 1. The latter is principally similar to the one described in FIG. 1 so that reference is made to the above discussion. Not shown but also present are the supply line 7, the ventilation valve 9 with the control device 10, the scavenging-air pump 11 and the intake zone 8 and the optional filter 14. In the second embodiment of the fuel system 1, the ventilation valve 17 is omitted in the ventilation line 4. However, it may optionally be provided. Instead of the ventilation valve 17, a bypass 22 with a bypass line 23 and a bypass valve 24 is assigned to the fuel system 1. The bypass valve 24 and the bypass line 23 are at least partially arranged in the fuel tank 2. On the side of the bypass line 23 which faces away form the fuel tank 2 a filter 25 is provided. In the here shown embodiment of the fuel system 1 it is provided that a deformation of the deformation region 18 is mechanically transmitted to the bypass valve 24. The deformation thus causes a force that opens the bypass valve 24. As an alternative, the deformation value can of course also be detected by means of a sensor (not shown) which interacts with the deformation region 18, and based on the detected deformation value the bypass valve 24 be controlled. When the negative pressure is generated in the fuel tank 2 during regeneration of the fuel accumulator 6 and thus the deformation region 18 is deformed or the deformation value exceeds the threshold value, the bypass valve 24 is opened so that air can flow from the environment 15 into the fuel tank 2. The influx occurs via the filter 25, the bypass line 23 and the bypass valve 24. In this way, damage to the fuel tank 2 as a result of deformation can also be effectively prevented when scavenging the fuel accumulator 6. In addition as already discussed, the ventilation valve 17 can of course also be present in the ventilation line 4, which ventilation valve 17 is closed when the deformation value exceeds the threshold value.

Figure 3:
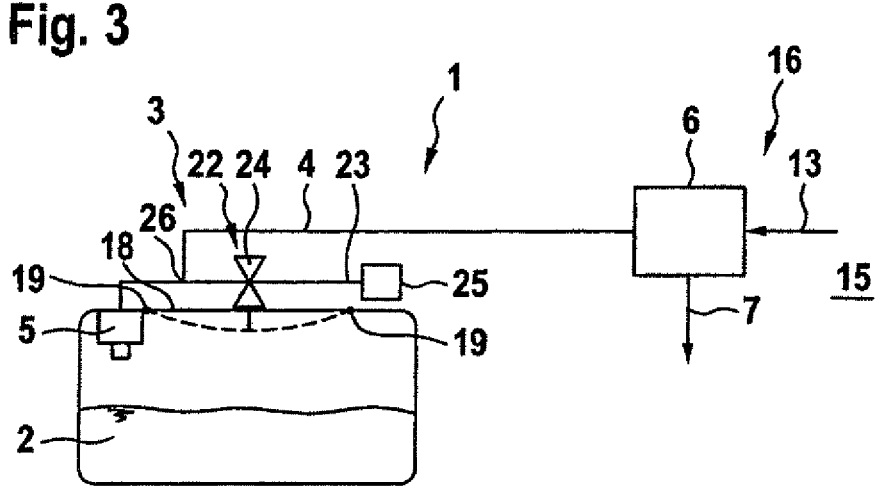

FIG. 3 shows a third embodiment of the fuel system 1. The same as set forth regarding the second embodiment mostly applies to this embodiment so that reference is made to the above discussion. The only difference is that the bypass line 23 and the bypass valve 24 are arranged outside the fuel tank 2. The bypass line 23 in this case branches off from the ventilation line at a branch point 26 downstream the ventilation valve 5.

Figure 4:
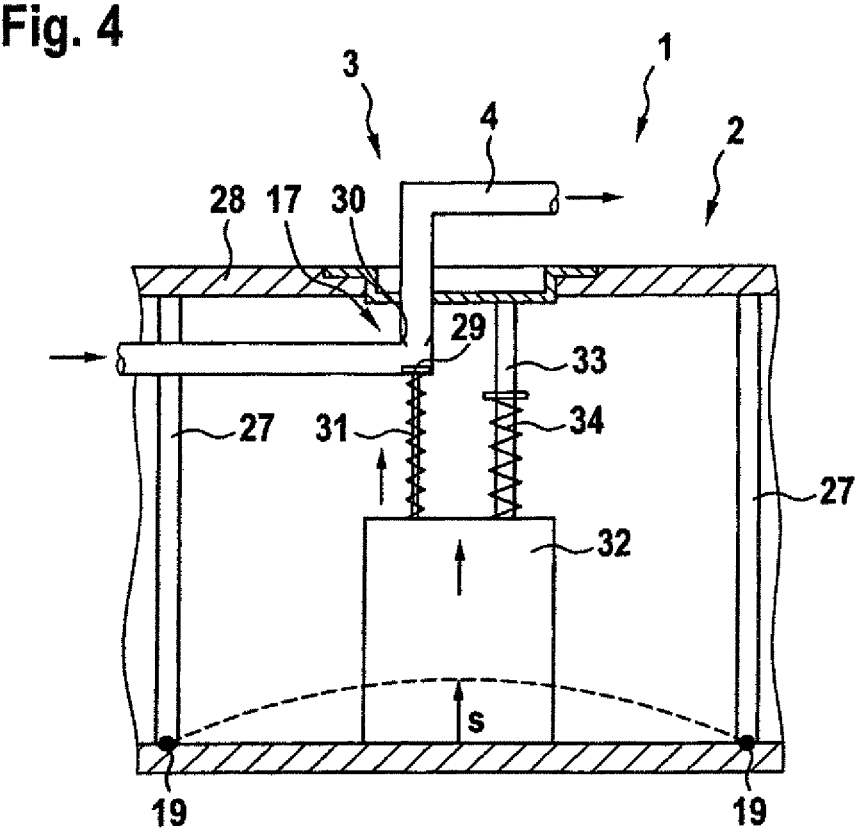

FIG. 4 shows a cross-section through the fuel tank 2. It can be seen that the fuel tank 2 has multiple stiffening elements 19 or support elements 27. The deformation region 18 is located between the stiffening elements 19 and two support elements 27. The stiffening elements 19 and the support elements 27 interact in order to prevent or at least decrease a deformation of regions of the fuel tank 2 or a fuel tank shell 28 that lie outside of the deformation region 18. Only outlined in FIG. 4 is the deformation value s of a deformation, which already exists in the deformation region 18. In the embodiment of the fuel system 1 shown in FIG. 4, the ventilation valve 17 is arranged in the fuel tank 2. It has a plunger 29 and a valve seat 30 interacting with the plunger 29. Via a force transmission element 31, which is configured as a rod, the plunger 29 is connected with a force-absorbing element 32 which is arranged or fastened on the deformation region 18. For guiding the force-absorbing element 32, one or multiple guide elements 33 are provided by means of which the force-absorbing element 32 is supported in the fuel tank 2 for displacement in vertical direction. Further, a restoring device 34 in the form of at least one spring is provided which urges the force-absorbing element 32 in the direction of the deformation region 18. At a deformation value of s=0 the ventilation valve 17, as shown in FIG. 4, is opened. When on the other hand the deformation region 18 is deformed, i.e., when the deformation value s increases, the ventilation valve 17 is closed when the deformation value reaches the threshold value.

Figure 5:
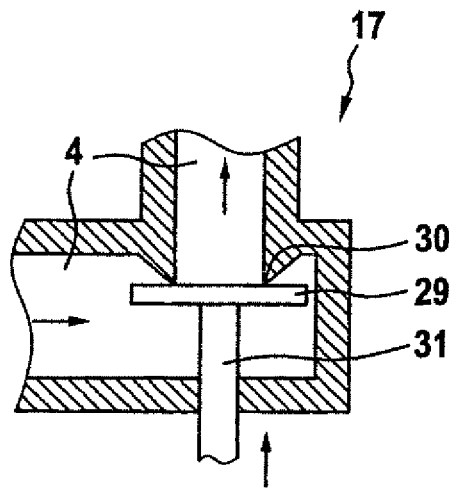

FIG. 5 shows a detail view of the ventilation valve 17 described by way of FIG. 4. Insofar reference is made to the above discussion.

Figure 6:
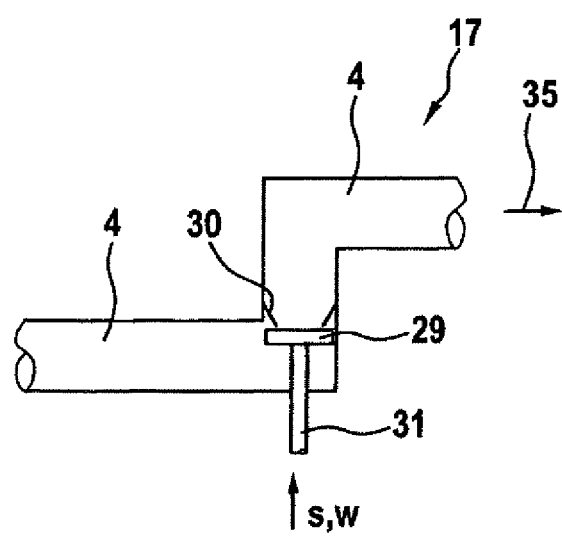

FIG. 6 shows a schematic representation of a first embodiment of the second ventilation valve 17. In this embodiment the ventilation valve 17 has the plunger 29 and the valve seat 30 which interacts with the plunger. The plunger 29 is controlled with a corresponding actuation path w in dependence on the deformation value s, wherein in the case of mechanical coupling of the ventilation valve 17 with the deformation region 18 the regulating variable w can correspond to the deformation value s. when the deformation region 18 is not deformed, i.e. when the deformation value s equals 0, the plunger 29 opens the valve seat 30 so that the ventilation valve 17 is open. When the deformation value s increases, or respectively when exceeding the threshold value, the regulating variable w is also increased so that the plunger 29 is urged in the direction of the valve seat 30 and sealingly rests against the same. In this way, flow through the ventilation valve 17 is interrupted. The flow-through direction of the ventilation valve 17 or the ventilation line 4 is indicated by the arrow 35.

Figure 7:
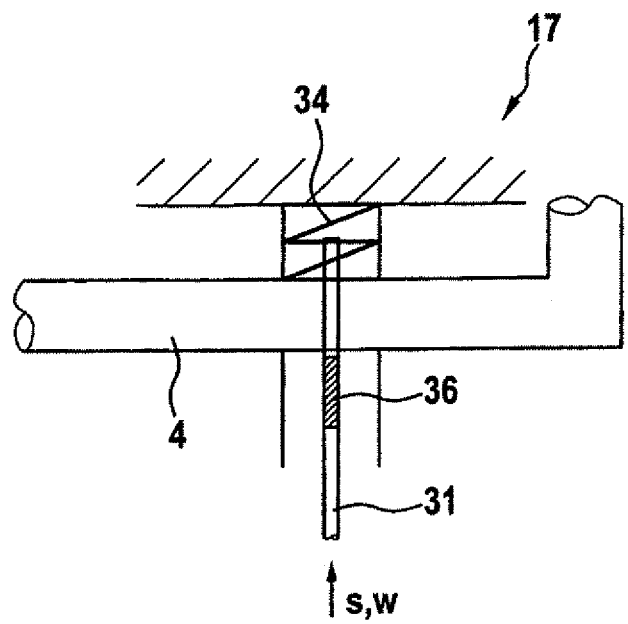

FIG. 7 shows a second embodiment of the ventilation valve 17. In this case a slider 36 is present which is inserted into the ventilation line 4 in dependence on the deformation value s, in order to open or block the flow cross-section. The ventilation valve 17 has a restoring device 34, which for example is constructed in the form of a helical spring.

Figure 8:
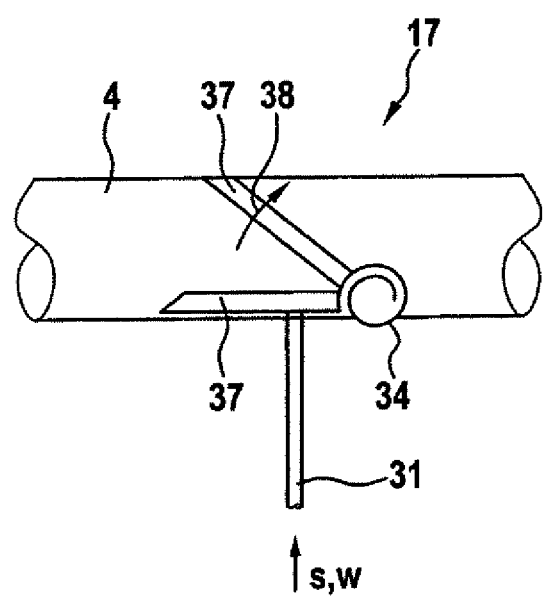

FIG. 8 shows a third embodiment of the ventilation valve 17. This embodiment has a rotatably supported flap 37 which is shown in FIG. 8 in a position in which it opens the ventilation line 4 and a position in which it blocks the ventilation line 4. The flap 37 is always urged by the restoring device 34 against the direction of the arrow 38, i.e., into the position in which the ventilation line is opened. However, when the deformation value s increases or exceeds the threshold value, the flap 37 is displaced via the force transmission element 31 arranged on the flap 37 in the direction of the position in which the ventilation line 4 is at least partially closed, in particular completely closed.

Figure 9:
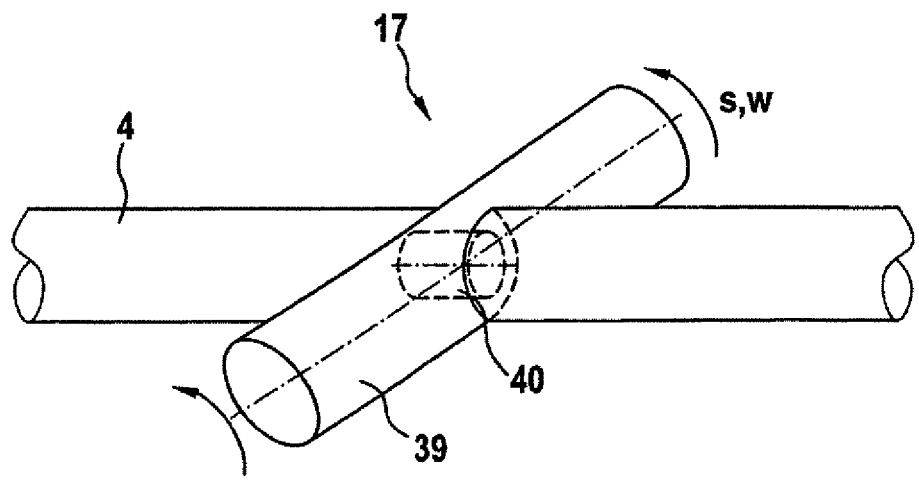

FIG. 9 shows the ventilation valve 17 in a fourth embodiment, wherein the ventilation valve 17 is in the position in which the ventilation line 4 is opened. In the here shown position, a drum slider 39 is present when the deformation region is not deformed, i.e., the deformation value s essentially equals 0 or is smaller than the threshold value. For this purpose the drum slider 39, which has a through opening 40, is arranged so that the fluid present in the ventilation line 4 can flow through the through opening, in particular the through opening is in this case coaxial to the region of the ventilation line 4 in which the drum slider is located. When the deformation value increases, in particular when exceeding the threshold value, the drum slider 39 is incrementally brought into the position shown in FIG. 10.

Figure 10:
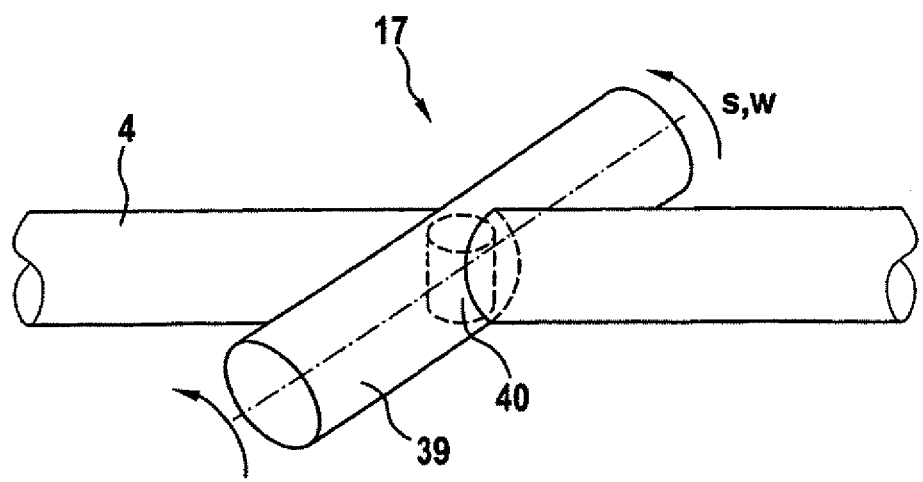

FIG. 10 shows the embodiment of the ventilation valve 17 known from FIG. 9, wherein the ventilation valve 17 is in the position in which the ventilation line 4 is completely blocked.

Figure 11:
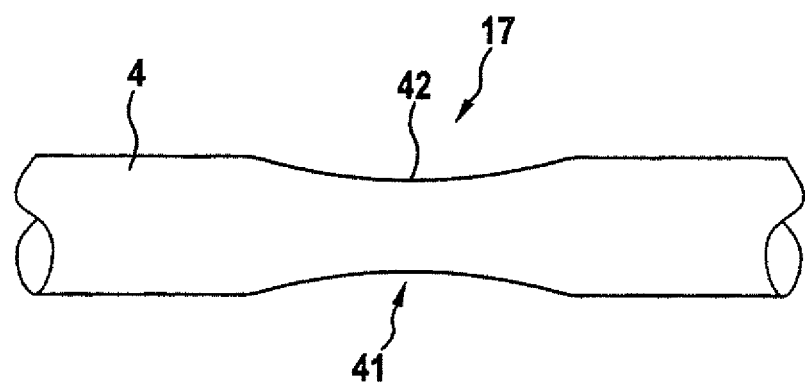

FIG. 11 shows a fifth embodiment of the ventilation valve 17 in a position in which the ventilation line 4 is substantially opened. The ventilation valve 17 essentially consists of a cross-section adjustment region 41 in which a wall 42 of the ventilation line 4 is configured flexible. By deforming the wall 42 in the cross-section adjustment region 41, the flow cross-section of the ventilation line can be adjusted. The flow cross-section is to decrease with increasing deformation value s.

Figure 12:
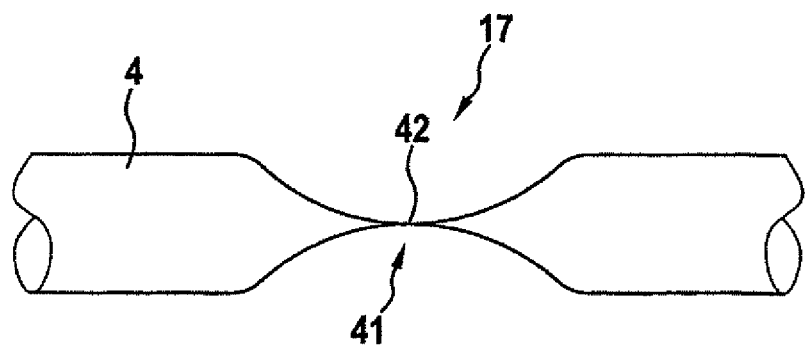

FIG. 12 shows the embodiment of the ventilation valve 17 of FIG. 11 in the position in which the ventilation line 4 is essentially completely closed. In the here shown embodiment it is advantageous when the wall 42 in the cross-section adjustment region 41 is elastic so that an elasticity force caused by the wall 42 always causes return to the position of the ventilation valve 17 shown in FIG. 11.

FIG. 13 shows a sixth embodiment of the ventilation vale 17. In this embodiment again a slider 36 is provided by means of which the ventilation line 4 can be blocked or opened. The slider 36 is arranged adjacent the deformation region 18. On the deformation region 18, a magnet 43, in particular a permanent magnet, is fastened. When the deformation of the deformation region 18 increases, the magnet 43 is displaced in the direction of the ventilation valve, as indicated. In the starting position of the magnet 43, in which the deformation region is not or only lightly deformed, the force is not sufficient to attract or arrange the slider 36, which is made of a magnetic or magnetizable material, so that the ventilation line 4 is blocked. On the other hand, when the deformation region 18 is deformed, the magnet 43 is arranged closer to the ventilation valve 17 so that now its force is sufficient to counteract an opposite force, which acts on the slider 36. The opposite force is for example caused by the influence of gravity or by the restoring device 34 (here not shown). When the force of the magnet 43 is no longer sufficient to arrange the slider 36 for closing the ventilation line 4, the ventilation line is opened.

FIG. 14 shows a first arrangement of the ventilation valve 17. The ventilation valve is here integrated into a separation device 44. More specifically, the ventilation valve 17 serves for releasing or blocking an outlet 45 of the separation device 44. For this purpose a valve seat 30 is provided on the outlet 45, while the plunger 29 is operatively connected with the deformation region 18. The here shown embodiment of the ventilation valve 17 with the plunger 29 and the valve seat 30, however, is to be understood purely exemplary. Generally, all aforementioned embodiments can be integrated in the separation device 44.

Figure 15:
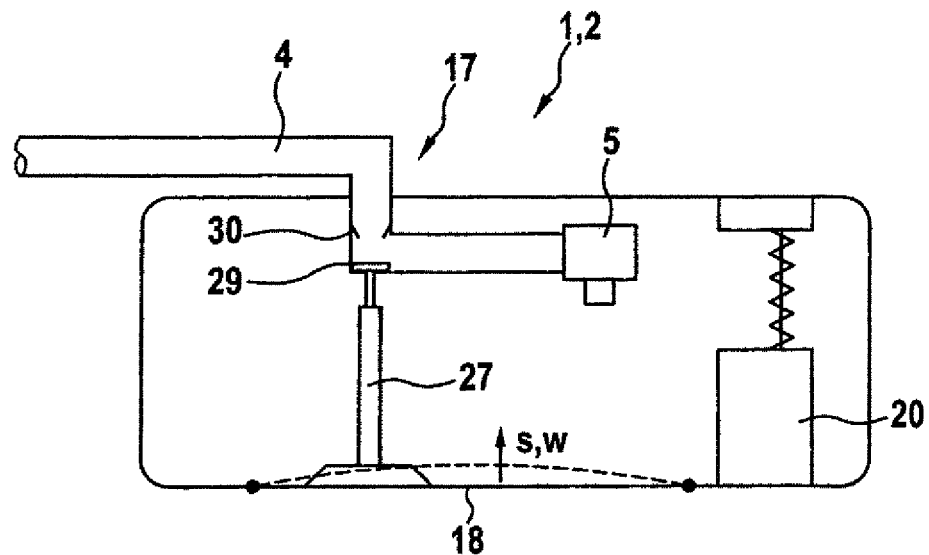

FIG. 15 shows a second arrangement of the ventilation valve 17. In this embodiment, the ventilation valve 17 is connected to the deformation region 18 via one of the support elements 27. Also in this case, the first embodiment of the ventilation valve 17 is shown with plunger 29 and valve seat 30, wherein however the other embodiments can also be operatively connected with the deformation region 28 via the support element 27.

Figure 16:
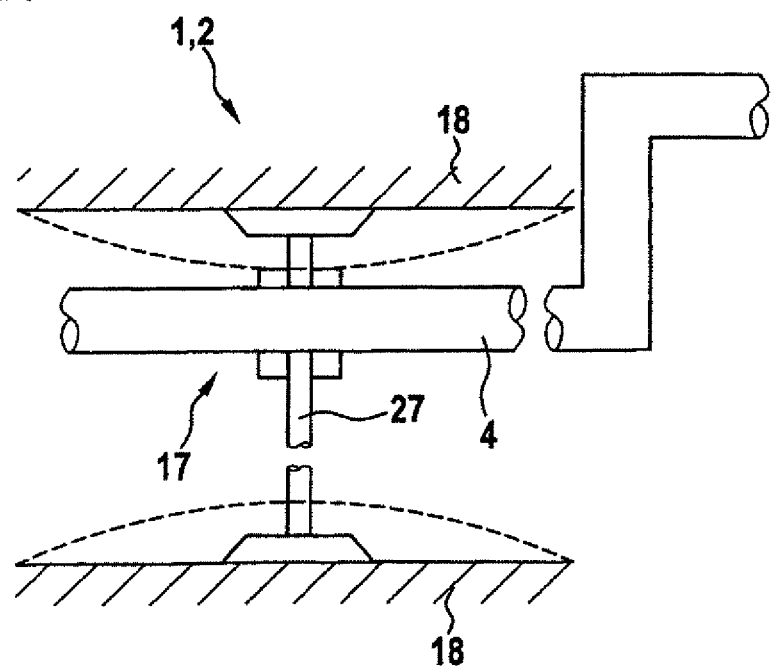

FIG. 16 shows a third arrangement of the ventilation valve 17. Here, the ventilation valve 17 is in the open position. Two opposing deformation regions 18 are connected with each other via the support element 27. As an alternative, a single deformation region 18 on one side can also be provided. In case of deformation of the deformation region 18 or the two deformation regions 18, the deformation is first permitted by the support element 27. The ventilation valve 17 is integrated with the support element 27 so that when the deformation region 18 is deformed the ventilation line 4 is incrementally closed.

Figure 17:
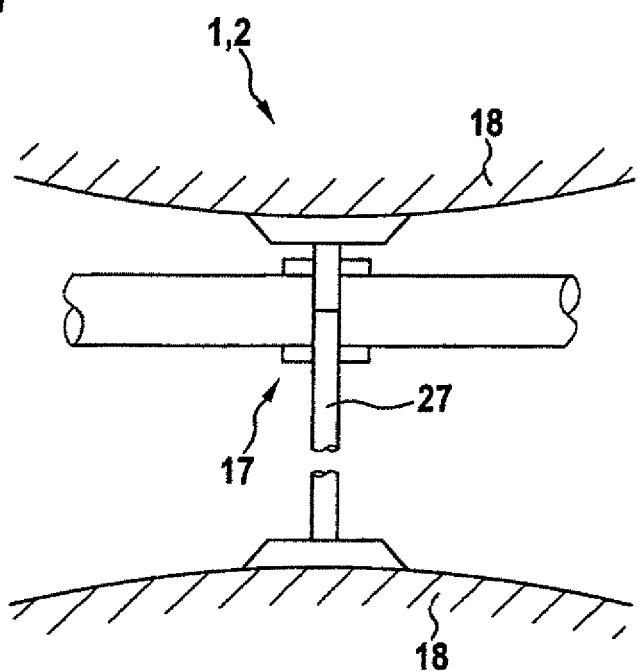

This is shown in FIG. 17. As soon as the ventilation valve 17 is completely closed, the support element 27 forms an end stop for the deformation of the deformation regions 18. The support element 27 thus does not allow further deformation of these regions. By means of the support element 27 a maximal deformation is set and subsequently the fuel tank or its deformation regions 18 are supported against each other so that no or only a slight additional deformation can occur. This arrangement allows combination with the embodiments of the ventilation valve 17 described above.

Figure 18:
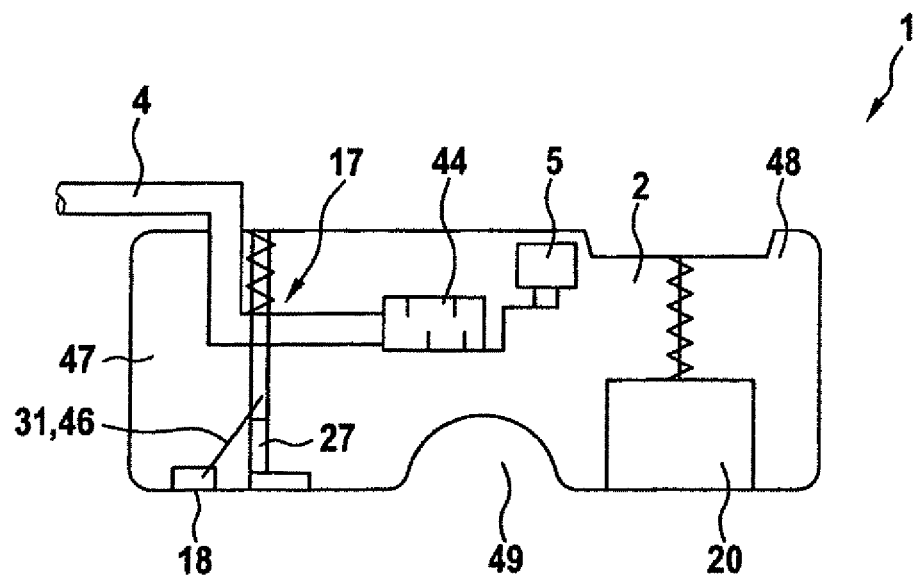

FIG. 18 shows a fourth arrangement of the ventilation valve 17. The ventilation valve 17 is arranged on the support element 27 or integrated into the support element 27. The support element 27 is rigid, i.e., it does not allow deformation. For this reason the ventilation valve 27 is operatively connected with the deformation region 18, which is located adjacent the support element 27, via an actuating element 46 or the force transmission element 31. The support element 27 and the ventilation valve 17 are located in a side chamber 47 of the fuel tank 2, while the fuel pump 20 is provided in a main chamber 48. Regions of the main chamber 48 are separated from the side chamber 47 by means of a web 49. Also in this case a combination with all embodiments of the ventilation valve 17 described above is possible.

Figure 19:
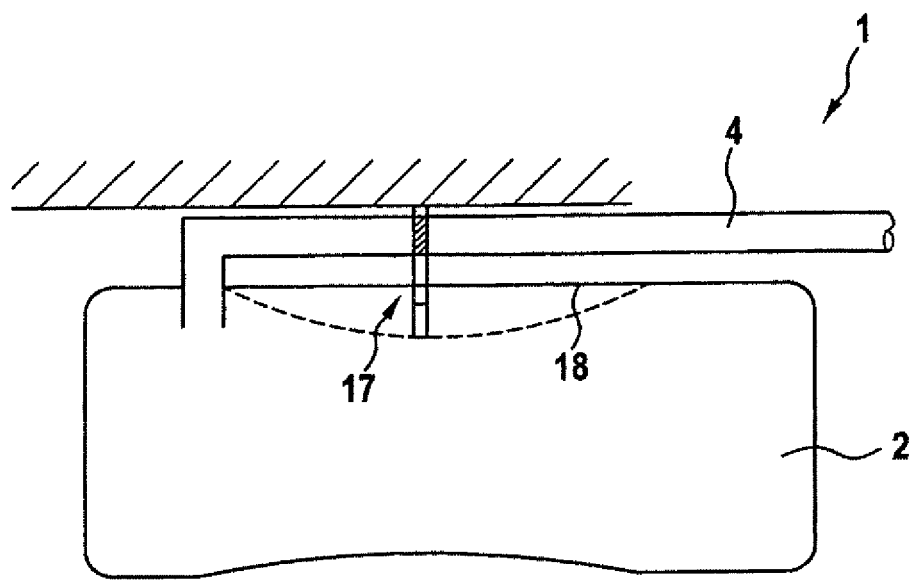

FIG. 19 shows a fifth arrangement of the ventilation valve outside the fuel tank 2. As mentioned above the ventilation valve 17 is connected with the deformation region 18 of the fuel tank 2 in order to close the ventilation line 4 as soon as the deformation value s of the deformation exceeds the threshold value.

Again, a combination with all embodiments of the ventilation valve 17 described above can be realized.

Figure 20:
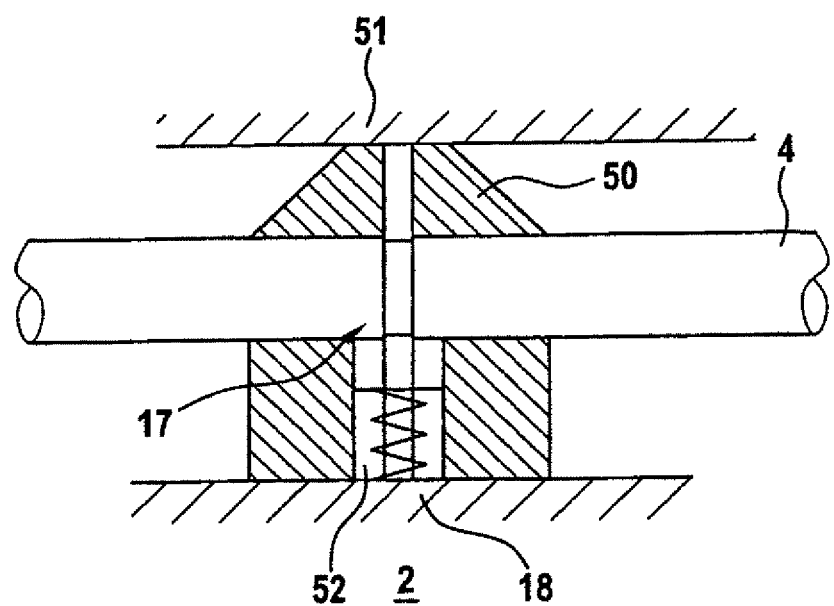

FIG. 20 shows a sixth arrangement of the ventilation valve 17 outside the fuel tank 2, wherein the ventilation valve 17 is integrated in a holding module 50 with which the fuel tank 2 is fastened to a body 51 of the motor vehicle. The deformation region 18 is for example provided in the region of a recess 52 of the holding module 50. In this recess 52 an operative connection between the ventilation valve 17 and the deformation region 18 also exists. This arrangement also allows combination with all embodiments of the ventilation valve 17 described above.

Figure 21:
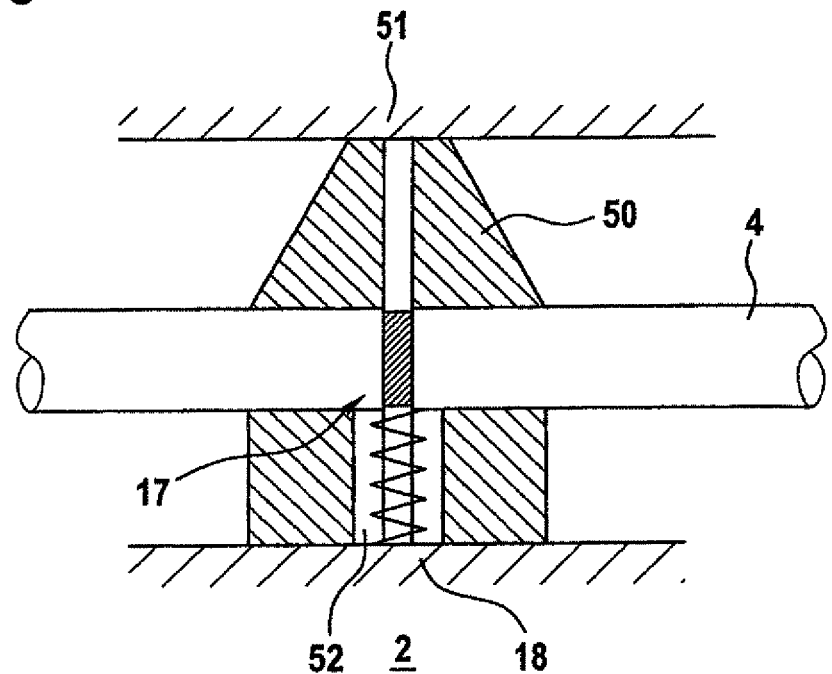

FIG. 21 shows the arrangement of the ventilation valve 17 known from FIG. 20, wherein the ventilation valve 17 is in a position in which the ventilation line 4 is essentially completely closed.

Figure 22:
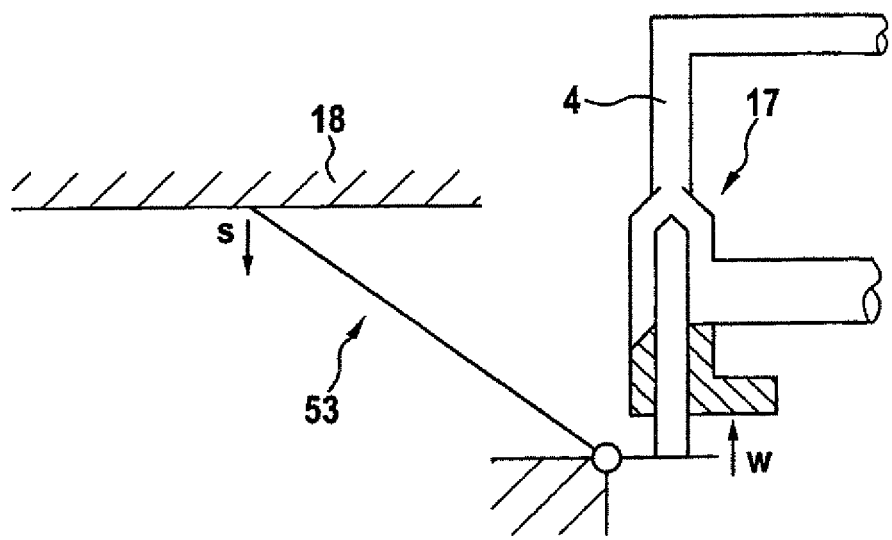

FIG. 22 shows exemplary a levered transmission 53, which is located between the deformation region 18 and the ventilation valve 17. The ventilation valve 17 is here again purely exemplary shown as a plunger 29, which interacts with the valve seat 30. The levered transmission 53 is for example configured so that the deformation value s is converted to a smaller actuation variable. As an alternative, an inverse configuration is possible in which the deformation value s results in a greater actuation path w.

Generally it is noted that the embodiments of the ventilation valve 17 and its arrangements described above can also be applied to the bypass valve 24 of the bypass 22. For this, the mode of action only has to be inverted so that the bypass valve 24 is opened with increasing deformation or when exceeding the threshold value by the deformation value.

The invention claimed is:

1. A method for operating a fuel system of a combustion engine, said fuel system comprising a fuel tank and a ventilation device, said ventilation device including a ventilation valve for ventilating the fuel tank in a direction of a device which at least intermittently generates a negative pressure, said method comprising:
    detecting a deformation value of a deformation of a deformation region of a fuel tank of the fuel system caused by an internal pressure of the fuel tank which is lower than a pressure outside the fuel tank, said deformation being directed toward an inside of the fuel tank; and
    closing the ventilation valve and/or opening a bypass when the deformation value exceeds a threshold value.

2. The method of claim 1, wherein the deformation of the deformation region is mechanically transmitted to the ventilation valve and/or a bypass valve of the bypass so that a force resulting from the deformation causes said closing the ventilation valve and/or said opening of the bypass.

3. The method of claim 1, wherein the deformation value is detected by means of a sensor and the ventilation valve is closed and/or the bypass valve opened by a control device connected with the sensor.

4. The method of claim 1, wherein the threshold value is selected so that the deformation of the deformation region occurs elastically when the deformation value is equal to the threshold value.

5. The method of claim 1, wherein the threshold value is determined as a function of an environmental condition.

6. The method of claim 5, wherein the threshold value is determined in dependence on a temperature.

7. A fuel system of a combustion engine, comprising:
    a fuel tank having a deformation region;
        a device which at least intermittently generates a negative pressure; and
        a ventilation device including at least one ventilation valve for ventilating the fuel tank in a direction of said device, wherein the fuel system is configured to detect a deformation value of a deformation of the deformation region of the fuel tank caused by an internal pressure of the fuel tank, and to close the ventilation valve and/or to open a bypass when the deformation value exceeds a threshold value, said deformation being directed toward an inside of the fuel tank.

8. The fuel system of claim 7, constructed for implementing the method of claim 1.

9. The fuel system of claim 7, further comprising at least one stiffening element arranged adjacent to the deformation region.

10. The fuel system of claim 7, wherein the ventilation device includes a ventilation line having opposing sides, said ventilation line being fluidly connected on one of the opposing sides with the fuel tank and fluidly connected on another one of the opposing sides with said device.

11. The fuel system of claim 7, wherein the bypass has a bypass line having opposing sides, said bypass line being fluidly connected on one of the opposing sides with the fuel tank and fluidly connected on another one of the opposing sides with an environment of the fuel tank.

12. The fuel system of claim 7, wherein the ventilation device includes a ventilation valve and/or the bypass line includes a bypass valve.

13. The fuel system of claim 7, wherein at least regions of the fuel tank are made of plastic.

14. The fuel system of claim 7, wherein the deformation region is made of plastic.

* * * * *